Nov. 3, 1964     W. L. GODMAN     3,155,377
DESTRATIFYING UNIFORM BLENDER
Filed Feb. 25, 1963     6 Sheets-Sheet 1
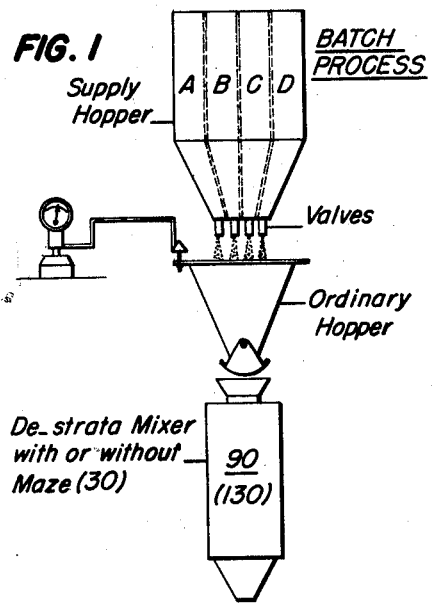
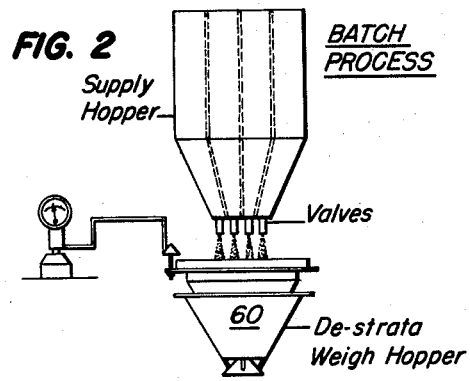
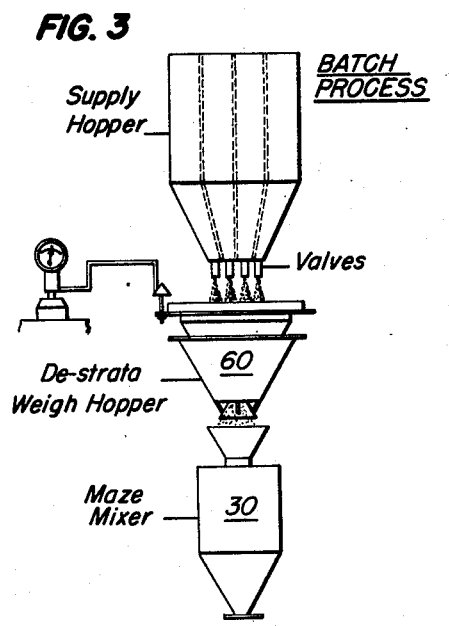
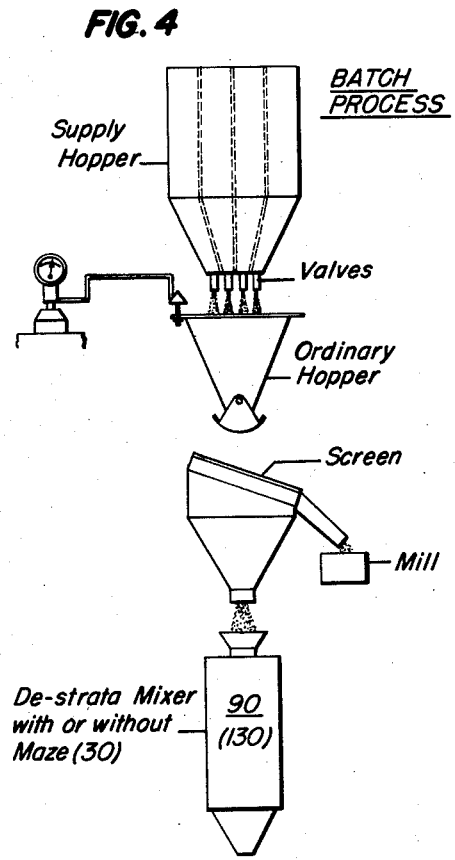
INVENTOR
Warren L. Godman
BY Walter G. Finch
ATTORNEY Nov. 3, 1964  W. L. GODMAN  3,155,377
DESTRATIFYING UNIFORM BLENDER
Filed Feb. 25, 1963  6 Sheets-Sheet 2
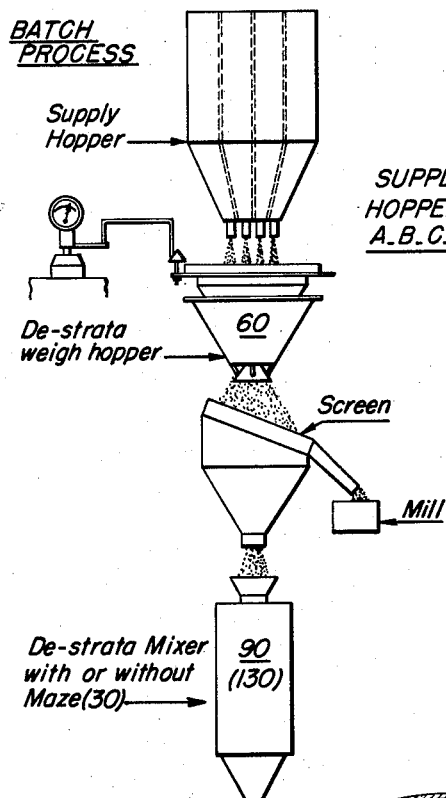
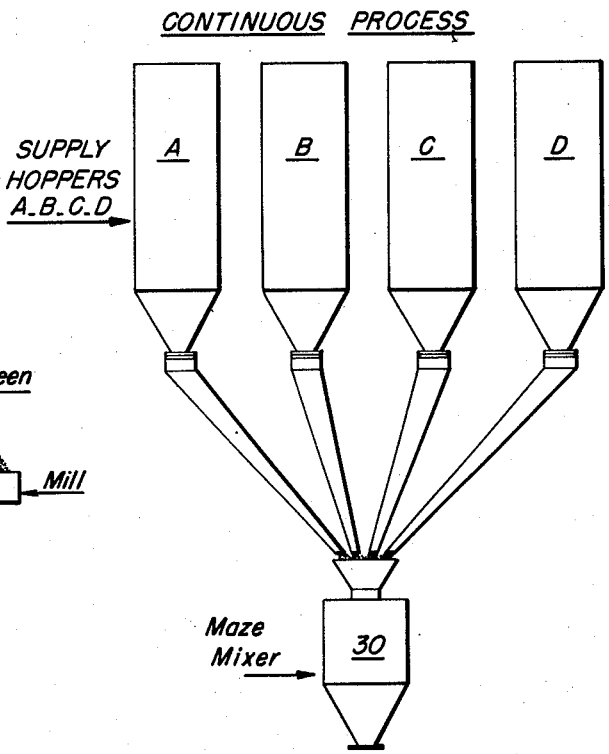
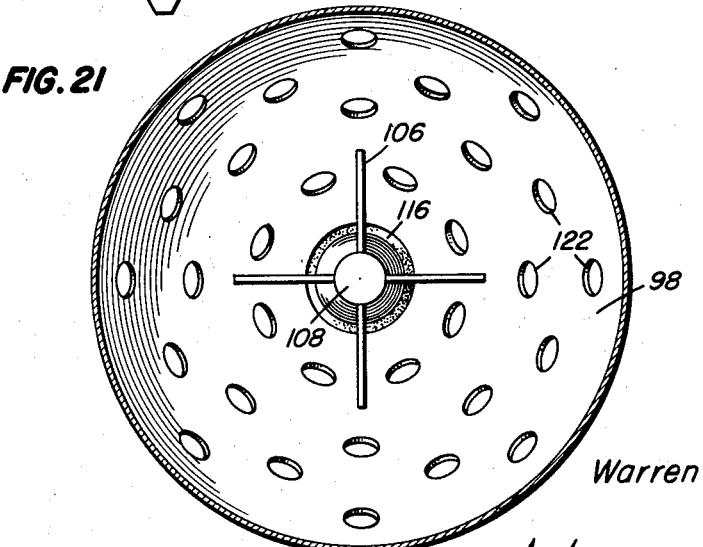
INVENTOR
Warren L. Godman
BY Walter G. Finch
ATTORNEY Nov. 3, 1964  W. L. GODMAN  3,155,377
DESTRATIFYING UNIFORM BLENDER
Filed Feb. 25, 1963  6 Sheets-Sheet 3

INVENTOR
Warren L. Godman

BY Walter G. Finch
ATTORNEY

Nov. 3, 1964 W. L. GODMAN 3,155,377
DESTRATIFYING UNIFORM BLENDER
Filed Feb. 25, 1963 6 Sheets-Sheet 4
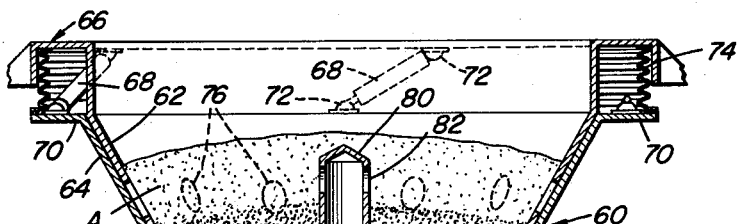
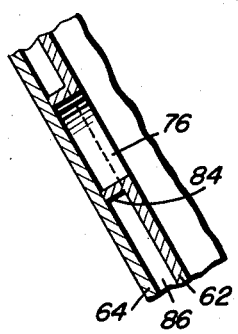
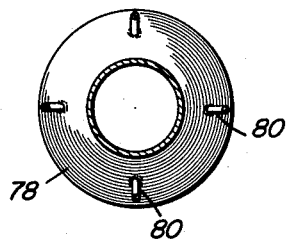
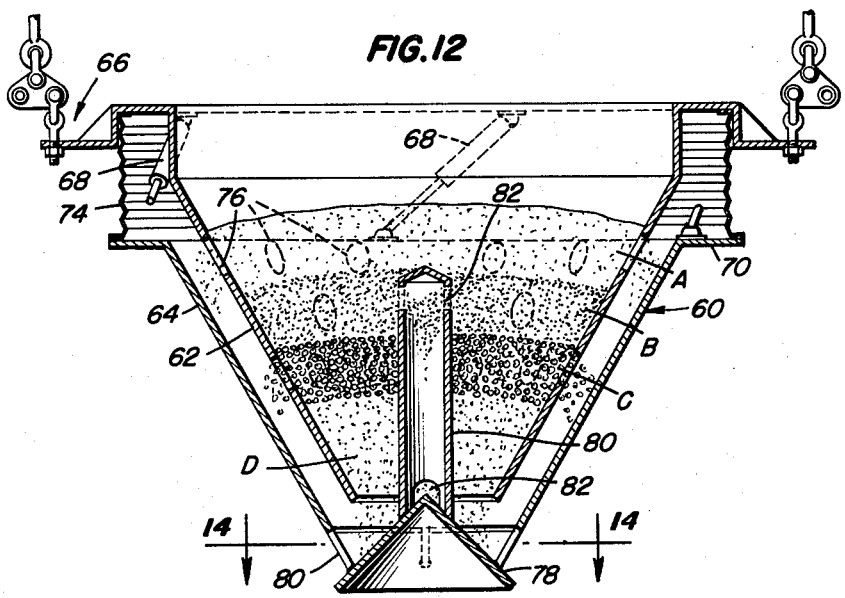
INVENTOR
Warren L. Godman
BY Walter G. Finch
ATTORNEY Nov. 3, 1964  W. L. GODMAN  3,155,377
DESTRATIFYING UNIFORM BLENDER
Filed Feb. 25, 1963  6 Sheets-Sheet 5

INVENTOR
Warren L. Godman

BY Walter G. Finch
ATTORNEY

Nov. 3, 1964  W. L. GODMAN  3,155,377
DESTRATIFYING UNIFORM BLENDER
Filed Feb. 25, 1963  6 Sheets-Sheet 6

INVENTOR
Warren L. Godman
BY Walter G. Finch
ATTORNEY

United States Patent Office 3,155,377
Patented Nov. 3, 1964

3,155,377
DESTRATIFYING UNIFORM BLENDER
Warren L. Godman, 6646 Loch Hill Road,
Baltimore 12, Md.
Filed Feb. 25, 1963, Ser. No. 260,546
18 Claims. (Cl. 259—180)

This invention relates generally to mixing apparatus, and more particularly it pertains to improvements in blenders of the gravity type designed to mingle dry materials.

Whenever dry materials of different kinds are added together by weight or volume, and then packaged for sale, it involves considerable handling in order that the resulting product is thoroughly blended.

Examples of such mixtures are prepared mortar, stock feed, and chemical fertilizers. Sometimes as many as eight different materials are used.

Various types of machines have been used to perform the mixing such as tumbling drums, paddle nats and screw troughs, but these require valuable floor space and are costly to operate and maintain.

Since it is usual to eliminate the ingredients to supply bins from which it is convenient to dispense, it has been attempted to cause blending of material by intermingling the simultaneous gravity discharge. This has been troublesome mainly because there is a tendency for each ingredient to segregate itself by grain size, density, or other physical factor and form a talus or a layer of its own. This is referred to as stratification in this specification and may occur in vertical or horizontal bands.

If a plurality of materials is to be mixed, say by shoveling, into a common pile, it will be noted that if large scoops are taken at a time, the resulting blend is not very uniform. It is obvious that the use of a smaller shovel will improve the blending. It is on this principle that the present invention operates, i.e., the intermingling of very small samples taken from a large area.

Accordingly, it is an object of this invention to provide an improved gravity mixer.

Another object of this invention is to provide a de-stratifying weight hopper for blending material as it is discharged after weighing. Still another object of this invention is to provide a de-stratifying batch receiver-mixer-blender.

To provide a continuous process maze mixer and blender system having no moving parts for producing a uniform product from a plurality of dry, free flowing granular materials, is yet another object of the invention.

This invention contemplates an improved self-cleaning, gravity type batch mixer, for dry powdery or granular material.

Still another object of this invention is to provide a self-cleaning, aperture for sieves and sifting type blenders.

To provide an aperture for sieves and sifting type blenders which more efficiently distributes and blends powdery and granular materials, is yet another object of this invention.

To provide a novel hopper surface which performs an especially thorough mixing action on material as it discharges therefrom, is yet another object of this invention.

To provide a self-cleaning discharge gate for conical hoppers, is yet another object of this invention.

Other objects and advantages of this invention will become more readily apparent and understood from the following detailed specification and accompanying drawings in which:

FIG. 1 is a schematic diagram of a direct mix type, non-classified, batch process blending plant embodying features of this invention;

FIG. 2 is a schematic diagram of a semi-mix type, non-classified, batch process blending plant embodying features of this invention;

FIG. 3 is a schematic diagram of a complete mix type, non-classified, batch process blending plant incorporating features of this invention;

FIG. 4 is a schematic diagram of a direct mix type, batch process plant similar to that of FIG. 1, but employing classification of materials;

FIG. 5 is a schematic diagram of a blending batch process plant illustrating the use of the novel de-stratifying weigh hopper in combination with the novel de-stratifying mixer;

FIG. 6 is a schematic diagram of the use of the improved gravity type mixer in a continuous process plant;

FIG. 11 is a vertical center section of another embodiment of the invention depicting a de-stratifying weigh hopper with its cone gate closed and filled with batch material;

FIG. 12 is a view similar to FIG. 11, but depicting the cone gate open and showing de-stratifying action;

FIG. 13 is a fragmentary cross section much enlarged of a modified sifting aperture for a re-stratifying mixer such as depicted in FIGS. 11 and 12 showing self-cleaning action;

FIG. 14 is a cross section taken on line 14—14 of FIG. 12;

FIG. 21 is a horizontal cross section taken on line 21—21 of FIG. 19.

Figure 7:
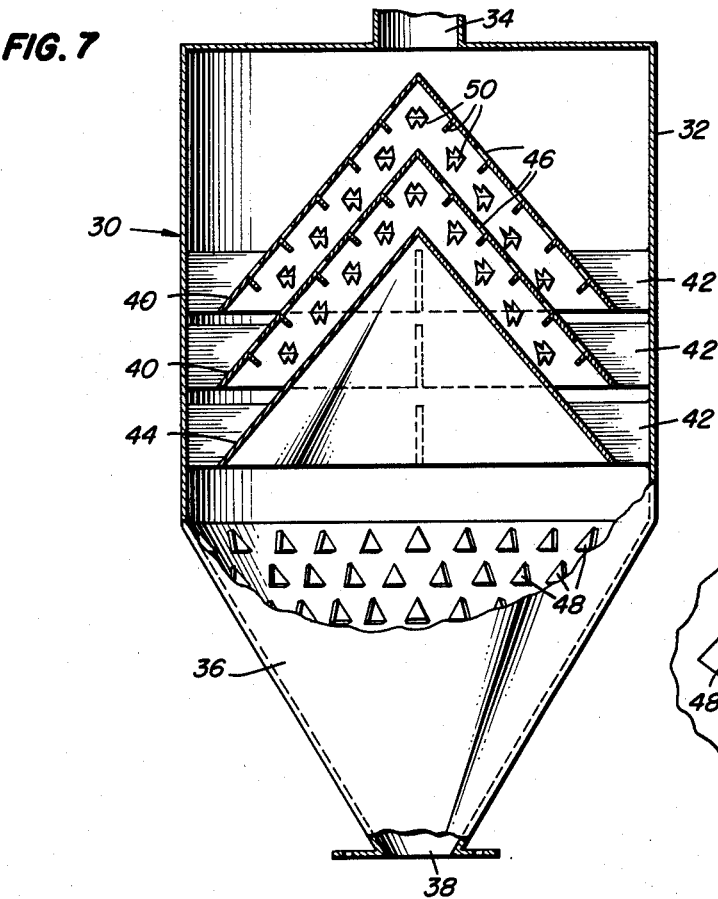
FIG. 7 is an elevation, partly broken away of the novel gravity mixer employing a mix hopper and maze arrangement.

Referring now to the details of the drawings and particularly to FIGS. 1 and 7, when several different ingredients A, B, C, D are to be mixed to provide a product, they are usually valued out in the batch process according to weight, one by one into a weighing hopper. Thus, it is that an ordinary hopper accumulates the ingredients in layers and when they are dumped therefrom into bags for shipment, a stratified product results not usually acceptable to the customer.

According to this invention, a maze gravity mixer 30 is interposed below a weigh hopper to more thoroughly blend the ingredients before they are bagged. This gravity mixer 30 as detailed in FIGS. 7, 8, 9, and 10, consists of a cylindrical housing 32 closed at the top, except for a feed port 34, and tapering at the lower end to form a mix hopper 36 and a discharge port 38.

Within the cylindrical portion of housing 32, a plurality of smaller diameter maze cones 40 are nested in spaced relationship. These cones 40 are mounted up and are centrally supported on radial spiders 42 which extend from the interior wall of the housing 32 so as to leave a small surrounding annular space thereagainst.

In similar fashion, a spreading cone 44 is nested and supported within the lowermost maze cone 40. The maze cones 40 are provided with a multitude of apertures 46 over their entire surfaces, but the spreading cone 44 is provided with a plain continuous surface.

Figure 8:
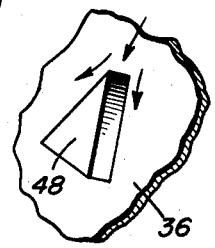
FIG. 8 is a fragmentary perspective detail view, much enlarged, of a mixer block for the mix hopper showing flow paths.

The mix hopper 36 is provided upon its interior surface with a plurality of staggered mix blocks 48 of appreciable thickness preferable of triangular shape and pointing upward as best indicated in FIG. 8.

Figure 9:
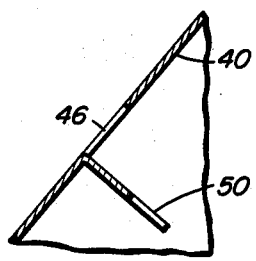
FIG. 9 is a fragmentary vertical section view, much enlarged, of a sift aperture for maze cones.
Figure 10:
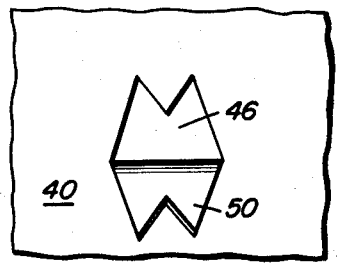
FIG. 10 is a somewhat enlarged detail view, in elevation, of the aperture of FIG. 9.

The apertures 46 of the maze cones 40 are preferably lanced inwardly with an M-shaped tool so as to provide a double pointed tongue 50 extending toward the adjacent nested cone 40 or 44 but not touching it as indicated in FIGS. 9 and 10.

In operation, the proportioned batch of ingredients falls through the port 34 upon the tip of the uppermost maze cone 40 and spreads over the surface thereof. As it encounters the apertures 46, portions fall therethrough and spread in doing so over the surface of tongues 50, falling therefrom at different times due to the double pointed extended shape. This action continues from one maze cone 40 to the next until the now well blended material arrives upon the non-apertured spreading cone 44.

The blended material falls off the lower perimeter of this cone 44 and joins with that which descends from the perimeters of the upper cones 40 through the previously mentioned annular space against the inner wall of the housing 32. Thence, the material flows down the surface of mix hopper 36, encountering blocks 48. It is forced to divert around them as shown by the arrows in FIG. 8, still furthering the blending action all the way to the discharge port 38.

The weighing hopper can be provided with the de-stratifying feature as shown in FIGS. 2 and 11. A pair of nested truncated cones 62 and 64 make up this embodiment of the invention 60.

The inner cone 62 depends from the annular ring of the weigh mechanism or balance 66, while the outer cone 64 is supported therefrom on a plurality of fluid cylinder actuators 68. These actuators 68 are spaced around the underside of the annular ring of the balance 66 and extended in a common direction angularly to an annular flange 70 at the top of the outer cone 64.

Each actuator 68 has a ball point 72 or equivalent at its ends so as it extends in action it can move to a more vertical rather than angular attitude to give a circular twisting action to the outer cone 64 as it separates from the inner cone 62, as indicated in FIG. 12.

A bellows type dust sleeve 74 encloses the space above flange 70 to protect the actuators 68 and allows the cones 61 and 64 to separate freely. The inner cone 62 is provided with a plurality of apertures 76 stagger spaced over its entire area. When the cones 62 and 64 are nested in contact, these apertures 76 are closed. At this time, the truncated ends of the cones 62 and 64 are also closed off by means of a small conical re-entrant cap 78. This cone or cap 78 is supported upon several spaced arms or rods 80 below the lower end of the outer cone 64 as best shown in FIGS. 12 and 14.

In operation, the cones 62 and 64 are separated after the batch materials A, B, C, D are weighed out on balance 66 by energizing and extending actuators 68. The cap 78 then unplugs the lower end of cone 62 and material from all strata of the contents discharges from the apertures 76 to impinge on the inner surface of outer cone 64 and blend as it moves thereover downward by gravity to emerge between the support rods 80.

Material discharging directly downward through the now open lower end of the inner cone 62, falls on the top of the cap 78 to mix with material passing through the rods 80. By mounting a capped, perforated center tube 80 upon the top of cap or cone 78, this lower discharge can be proportioned as desired with relation to that moving on the inner face of cone 64. Apertures 82 can be so located in this tube 80 to well sample the various strata of material A, B, C, D. In addition, the tube 80 acts as a dislodgement probe to prevent any tendency for surrounding material to cake or lump.

Self-cleaning scraping action for apertures 76 of the inner cone 62 can be augmented by providing each with an outwardly extending collar or flange 84 as depicted in FIG. 13. As the two cones 62 and 64 close upon each other, the latter cone 64, as previously mentioned, is describing as well a twisting motion. This causes the narrow end of the flange 84 to scrape with considerable line pressure upon cone 64 for good closure of each aperture 76. The residual space 86 equal to the height of flanges 84 allows the opposing faces of the cones 62 and 64 to readily clear themselves of material as well.

Figure 15:
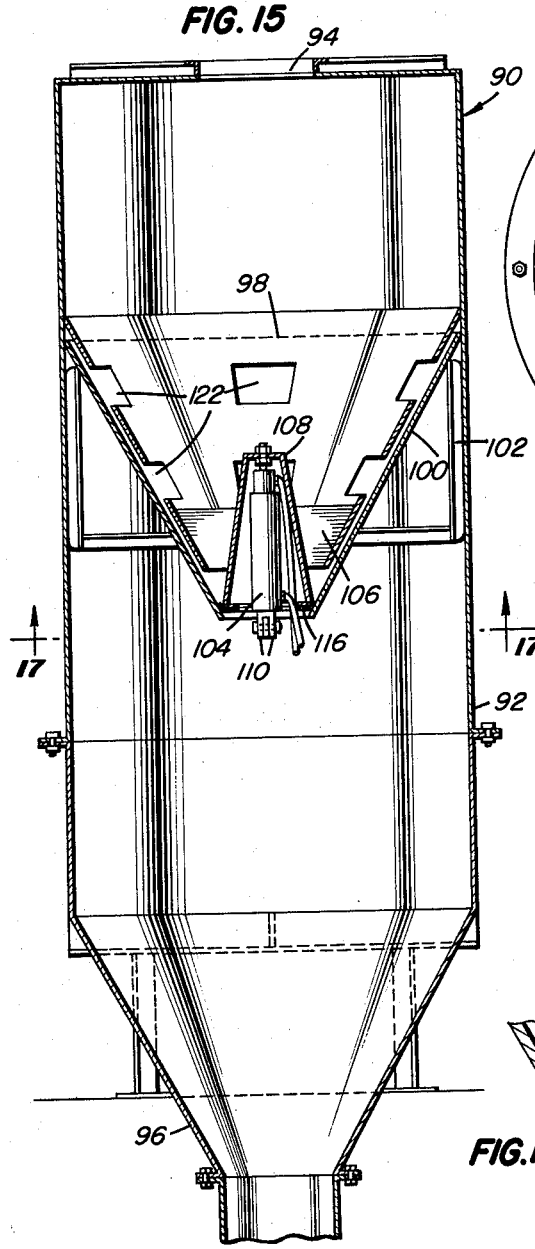
FIG. 15 is a vertical section view of a gravity type de-stratifying mixer embodiment of the invention designed to be used with separate mass or volume proportioning equipment.
Figure 16:
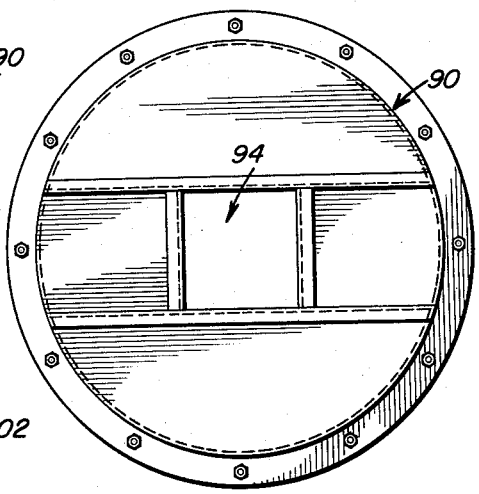
FIG. 16 is a top view of the mixer of FIG. 15.
Figure 19:
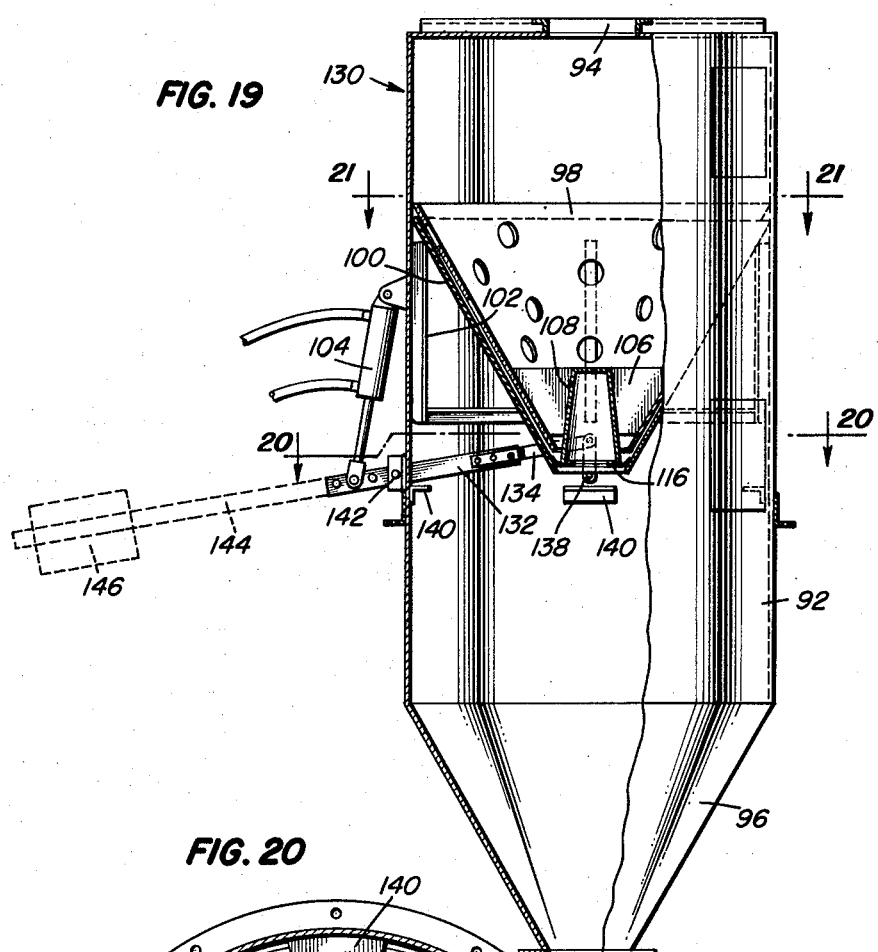
FIG. 19 is a side elevation, partly in vertical center section, of yet another embodiment of the invention.

FIGS. 15 and 19 illustrate two more embodiments of gravity mixer 90 and 130 of the invention useful where external conventional weighing or volume proportioning devices are available and where more adequate blending of the material is desired without expenditure of power for operating tumblers, stirrers or the like.

The gravity mixer 90 illustrated in detail in FIGS. 15 to 18 inclusive comprises a cylindrical housing 92 having a feed port 94 in the top and a discharge hopper 96 at the bottom.

A perforated inner de-stratifying cone 98 is fixed at its periphery to the inner wall of the housing 92. This inner cone 98 depends downward to nest with a plain outer cone 100. The outer cone 100 is vertically movable and is maintained coaxial with cone 98 by means of a guide frame 102 which slides along the inner wall of housing 92.

Figure 17:
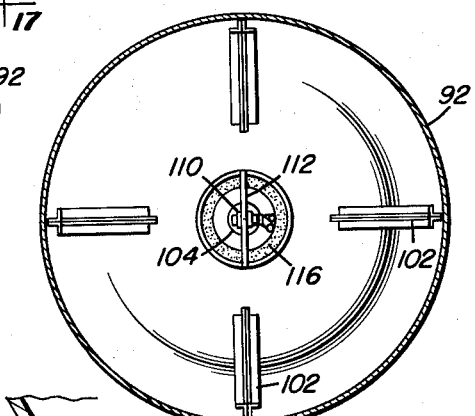
FIG. 17 is a horizontal cross section taken on line 17—17 of FIG. 15.

A fluid cylinder actuator 104 is located vertically within the truncated ends of the cones 98 and 100. It is attached at its upper end to the cone 98 by means of a spider 106 and a re-entrant conical housing 108. The lower end of the actuator 104 is connected by means of a clevis 110 to the center of a cross bar 112 fixed across the lower or discharge end of cone 100, as indicated in FIG. 17.

Figure 18:
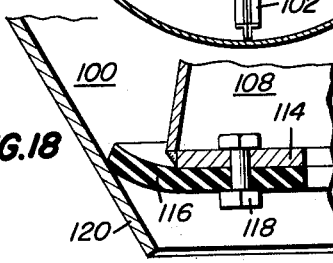
FIG. 18 is a much enlarged fragmentary detail of the gate for the mixer depicted in FIG. 15.

An inturned flange 114 at the lower end of the housing 104 mounts an annular or rubber gate ring 116 on bolts 118 so as to be in interference fit with the discharge end 120 of outer cone 100 as best seen in FIG. 18.

With this arrangement, successive ingredients or proportioned batches of material are received in the nested cones 98 and 100. When the actuater 104 is energized, it extends. This separates the interfaces of the cones 98 and 100 by lowering the outer cone 100. At the same time, the discharge end 120 drops away from the rubber gate ring 116. The various strata of the material discharge through the perforations 122 of cone 98 and become well mixed as it cascades down the inner surface of outer cone 100 and out the discharge end 120.

When the actuator 104 is retracted after the batch is discharged, the cones 98 and 100 re-nest and the gate ring 116 again closes the discharge end 120 ready to receive another batch of material.

Figure 20:
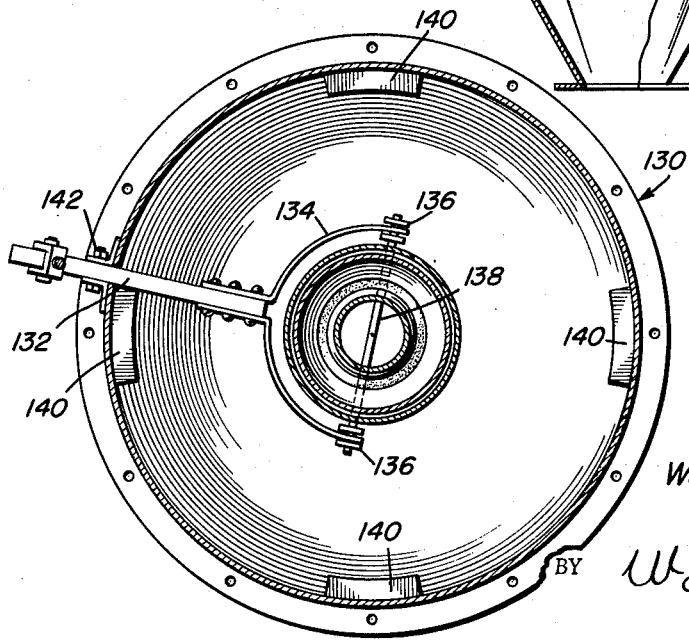
FIG. 20 is a horizontal cross section taken on line 20—20 of FIG. 19.

The gravity mixer 130 shown in detail in FIGS. 19, 20, and 21 has most of the features of mixer 90 except it is adapted for either manual or fluid actuator operation. The housing 108 serves only to support the gate ring 116. The actuator 104, if used, is instead pivotally attached to the exterior of the main housing 92. The lower or drive end of the actuator 104 is attached to a pivoted gate lever 132 which passes to the interior of the mixer 130 terminating in a yoke 134. A pair of links 136 are pivotally secured at the ends of yoke 134 and extend downwardly and engage the ends of a rod 138 which is diametrically secured through the discharge end of the collecting or outer cone 100. To limit the downward movement of the guide frame 102, stops 140 are provided on the inner wall of the housing 92.

In operation, the actuator 104 thrusts outwardly as shown to close the cones 98 and 100 against each other and engage the gate ring 116 tightly in the discharge end of the latter. The cones 98 and 100 separate and gate ring 116 opens when actuator 104 retracts, the action being translated through lever 132 oppositely through the pivot 142.

If the actuator 104 is disengaged from lever 104 and an extension arm 144 attached at this point, this gravity mixer 130 can be manually operated therewith. By means of a counterweight 146 at the extended end of arm 144, the cones and gate are kept normally closed.

It will be noted in FIGS. 15 and 19 that the gravity mixers 90 and 130 provide plenty of room below the destratifying cones 98 and 100 for the installation of elements of the maze mixer 30 described in conjunction with FIG. 7.

Accordingly, many combinations suggest themselves for mixing plants as illustrated in FIGS. 1 to 6 inclusive. Having no gate action, the mixer 30 is especially adapted to the continuous blending plant of FIG. 6.

Obviously many modifications and variations of the present invention are possible in light of the above teachings. It is, therefore, to be understood that within the scope of appended claims the invention may be practiced otherwise than as specifically described.

What is claimed is:

1. Apparatus for blending, comprising a housing, first conical means positioned within said housing to receive a stream of materials fed into said housing, and a second conical means positioned within said housing below said first conical means and arranged to be separated therefrom in nested relationship and to have a discharge substantially in register therewith, said first conical means having a large number of apertures therein in spaced staggered relationship so that a large number of random portions of said stream of material passes through to said second conical means, whereby upon discharge of said stream of material from said first conical means, said random portions thereof collected by said second conical means are recombined therewith to effect gravity mixing.

2. The apparatus of claim 1, wherein said first conical means includes a plurality of inverted cones and the discharge of said second conical means is from the base thereof.

3. The apparatus of claim 1, wherein said first and second conical means are truncated and the truncated ends thereof extend downwardly, and additionally said second conical means are vertically movable with respect to said first conical means to be in substantial nested contact therewith, means to effect the vertical movement of said second conical means are provided, and means for sealing the truncated end of said second conical means during said nested contact with the first conical means are provided, whereupon separation of said first and second conical means from each other permits material to flow through the apertures in said first conical means and to be recombined with the stream of material flowing therefrom at the discharge of said second conical means.

4. The apparatus of claim 3, wherein said means to effect the vertical movement of said second conical means are positioned substantially coextensive with said means for sealing.

5. The apparatus of claim 3, wherein said means to effect the vertical movement of said second conical means are positioned about the periphery of the base thereof.

6. The apparatus of claim 5, wherein said means to effect the vertical movement of said second conical means provide a thrusting motion thereto during the vertical movement thereof.

7. The apparatus of claim 3, and additionally weighing means connected to said housing are provided so that known quantities of a plurality of materials can be sequentially charged onto said first conical means when it is in nested contact with said second conical means and said plurality of materials are mixed upon separation of said first and second conical means.

8. The apparatus of claim 3, wherein said means for sealing is a re-entrant cone and means are provided to secure said cone at spaced points to the truncated end of said second conical means so that when said first and second conical means are in nested contact, the truncated ends thereof are concurrently sealed.

9. The apparatus of claim 3, wherein said means for sealing includes a fixed annular ring coextensive with the truncated end of said second conical means and an annular rubber ring secured to said fixed annular ring and extending from the edge thereof to contact the inner walls of said second conical means in an interference fit when said second conical means are in close nesting arrangement with said first conical means.

10. A gravity type mixer for blending a stream of materials during passage therethrough, comprising structure defining a housing for receiving said stream of materials, first means positioned within said housing to separate said stream of materials at a multitude of different locations across said stream substantially into small streams thereof, and second means positioned within said housing downstream from said first means to recombine said stream of materials including said small streams thereof at different relative locations with respect to each other into a discharge stream of material, whereby the stream of materials originally fed into said housing is gravity blended.

11. A gravity type mixer for blending a stream of materials during passage therethrough, comprising structure defining a housing for receiving said stream of materials, distributing means positioned within said housing in the path of said stream of materials to deflect said stream about the interior wall of said housing and including means to separate at least a portion of the deflected stream into a multitude of small streams of materials, and means positioned within said housing downstream from said distributing means to recombine said deflected stream including said small streams of materials into a discharge stream of material whereby the stream of materials originally fed into said housing is gravity blended.

12. A gravity type mixer for blending a stream of materials during passage therethrough, comprising structure defining a housing for receiving said stream of materials, inverted conical means positioned within said housing in the path of said stream of materials to deflect said stream about the interior wall of said housing and including means to separate at least a portion of the deflected stream into a multitude of small streams of material, and collecting means positioned within said housing downstream from said inverted conical means to recombine said deflected stream including said small streams of materials into a discharge stream of material whereby the stream of materials originally fed into said housing is gravity blended.

13. The gravity type mixer of claim 12, wherein said inverted conical means includes a plurality of cones in spaced nested relationship and said plurality of cones are secured by spider members extending inwardly from said housing.

14. The gravity type mixer of claim 12, wherein said means to separate are apertures formed in staggered relationship in said inverted conical means.

15. The gravity type mixer of claim 14, wherein said apertures are M-shaped and have a projection inclined downwardly and inwardly from the lower edge of each.

16. The gravity type mixer of claim 12, wherein said collecting means is arranged to receive and distribute the portion of the stream of materials that is separated into small streams among the unseparated portion thereof.

17. A gravity type mixer for blending a stream of materials during passage therethrough, comprising structure defining a housing for receiving said stream of materials, inverted conical means positioned within said housing in the path of said stream of materials to deflect said stream about the interior wall of said housing and including means to separate at least a portion of the deflected stream into a multitude of small streams of materials, and collecting means positioned within said housing downstream from said inverted conical means to recombine said stream of materials including said small streams of materials into a discharge stream of material, said housing having a lower inwardly tapering portion at the lower end thereof to receive said discharge stream of materials and means positioned on the interior wall of said tapering portion to separate and combine said discharge stream of material to thereby obtain further gravity mixing thereof.

18. The gravity type mixer of claim 17, wherein said means positioned on the interior wall of said tapering portion includes a multitude of triangularly shaped blocks arranged in staggered relationship and pointing upwardly.

References Cited in the file of this patent

UNITED STATES PATENTS

| | | |
|---|---|---|
| 1,072,143 | Mills et al. | Sept. 2, 1913 |
| 1,679,099 | Smith | July 31, 1928 |
| 2,073,553 | Dienst | Mar. 9, 1937 |

FOREIGN PATENTS

| | | |
|---|---|---|
| 552,350 | Italy | Dec. 1, 1956 |
| 668,439 | Great Britain | Mar. 19, 1952 |